United States Patent [19]

Mok

[11] Patent Number: 5,617,455
[45] Date of Patent: Apr. 1, 1997

[54] INTERFACE METHOD AND DEVICE IN DIGITAL SIGNAL PROCESSING SYSTEM

[75] Inventor: Cheol-Woong Mok, Incheon, Rep. of Korea

[73] Assignee: Samsung Electronics Co., Ltd., Kyungki-Do, Rep. of Korea

[21] Appl. No.: 330,783

[22] Filed: Oct. 28, 1994

[30] Foreign Application Priority Data

Feb. 7, 1994 [KR] Rep. of Korea .................... 2311/1994

[51] Int. Cl.⁶ .................................................. H04L 23/00
[52] U.S. Cl. ...................... 375/377; 375/220; 375/242; 369/275.3
[58] Field of Search ...................... 375/242, 220, 375/377; 369/32, 47, 48, 54, 275.3; 370/60, 105.1, 105.4

[56] References Cited

U.S. PATENT DOCUMENTS

| | | | |
|---|---|---|---|
| 5,388,093 | 2/1995 | Yoshida et al. | 369/275.3 |
| 5,420,849 | 5/1995 | Matsueda et al. | 369/275.3 |
| 5,499,232 | 3/1996 | Hardwick | 369/275.3 |
| 5,521,900 | 5/1996 | Ando et al. | 369/275.3 |

*Primary Examiner*—Stephen Chin
*Assistant Examiner*—Don Vo
*Attorney, Agent, or Firm*—Sughrue, Mion, Zinn, Macpeak & Seas

[57] ABSTRACT

An interface method and device in a digital signal processing system which stores digital data regenerated from a recording unit in a memory, reads the digital data from the memory in response to a data transmission request signal of an object interface part, and transmits the read digital data to the object interface part in units of sound groups and also transmits channel classification data of 1 byte to classify the channel of the transmitted data together with the digital data to the object interface part.

5 Claims, 5 Drawing Sheets

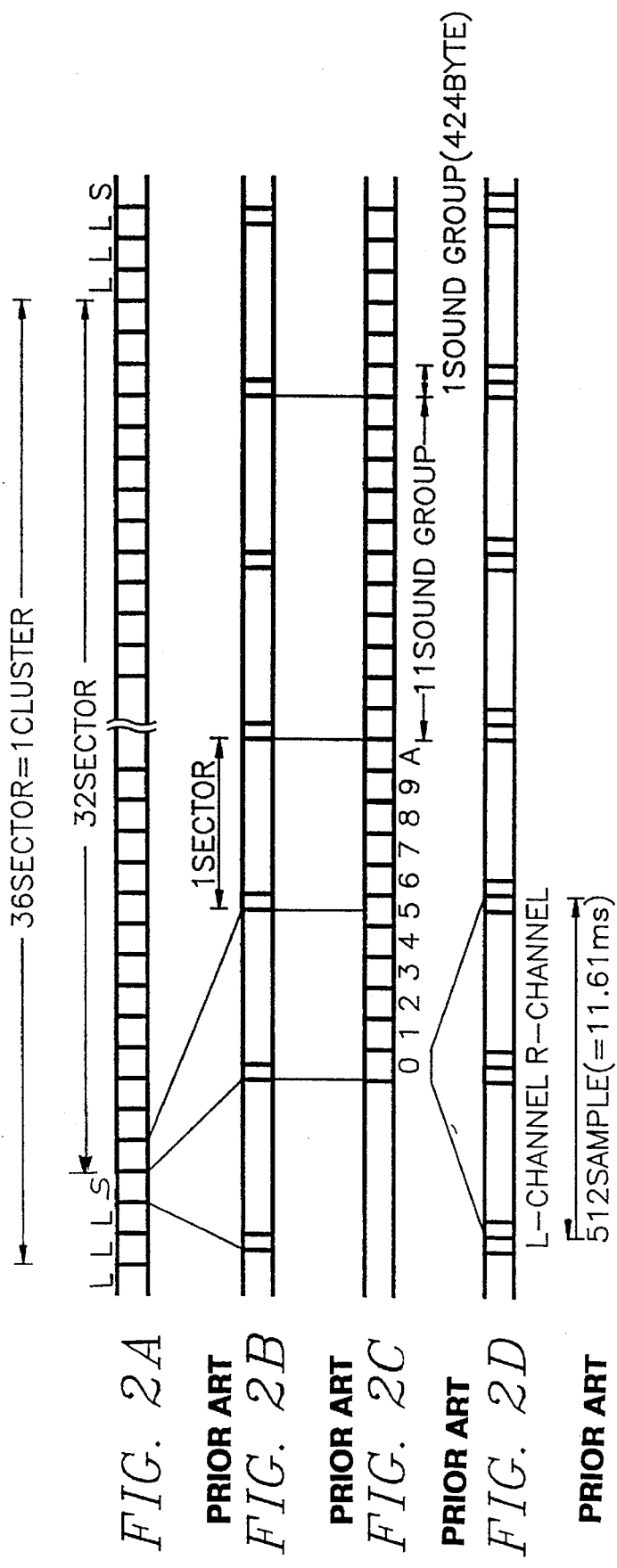

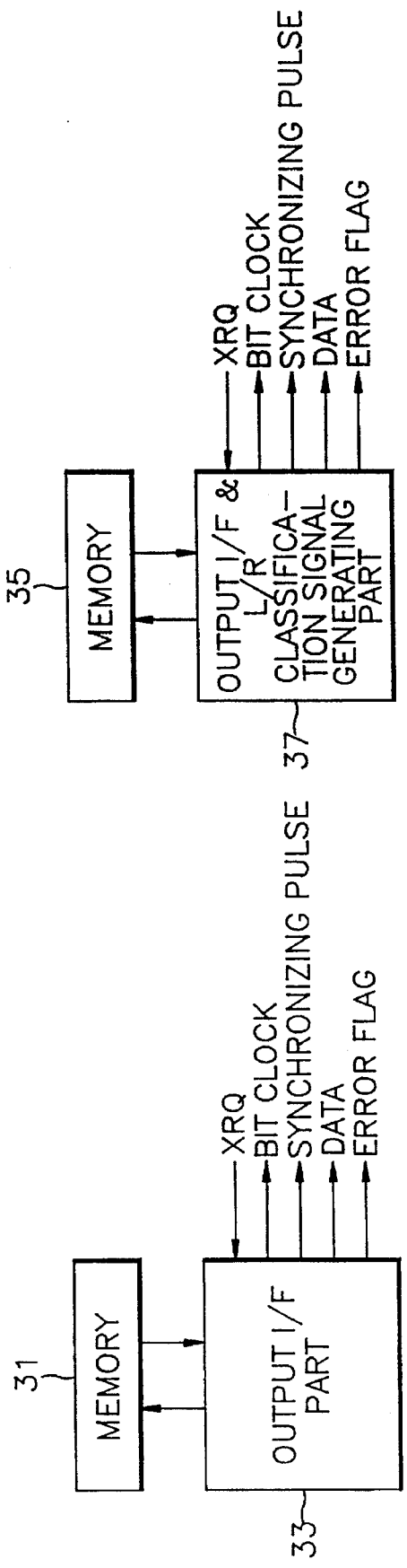

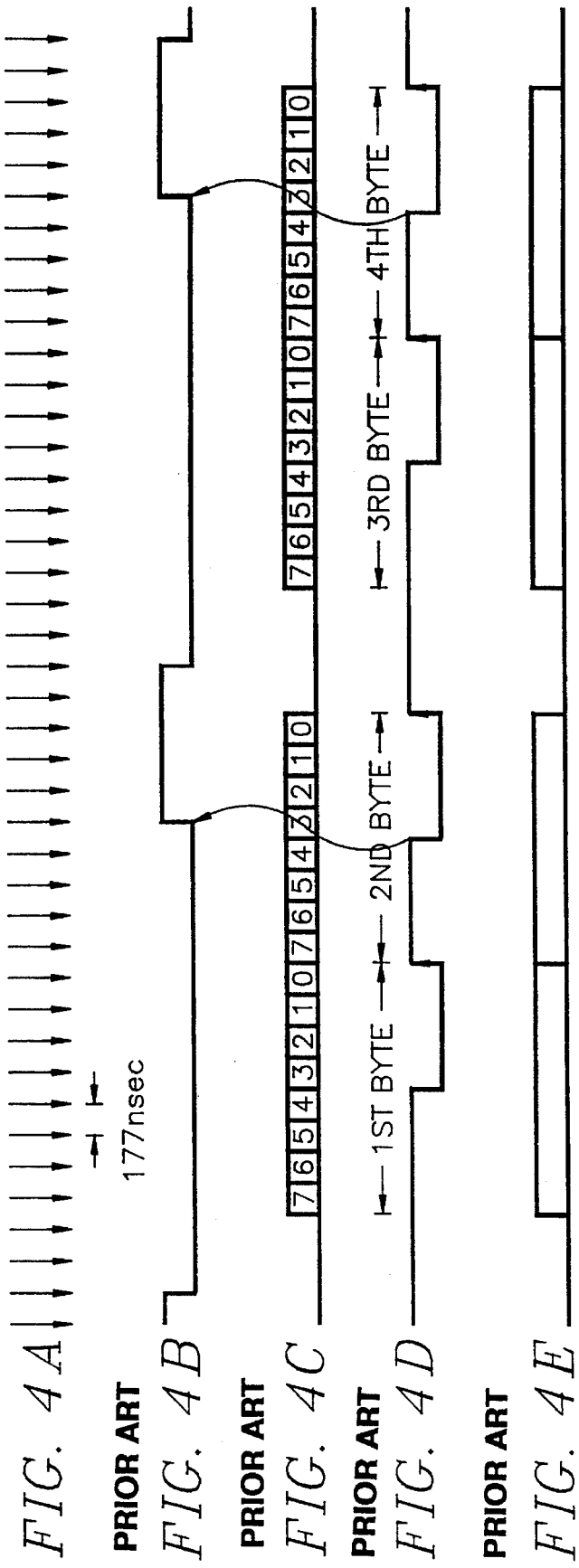

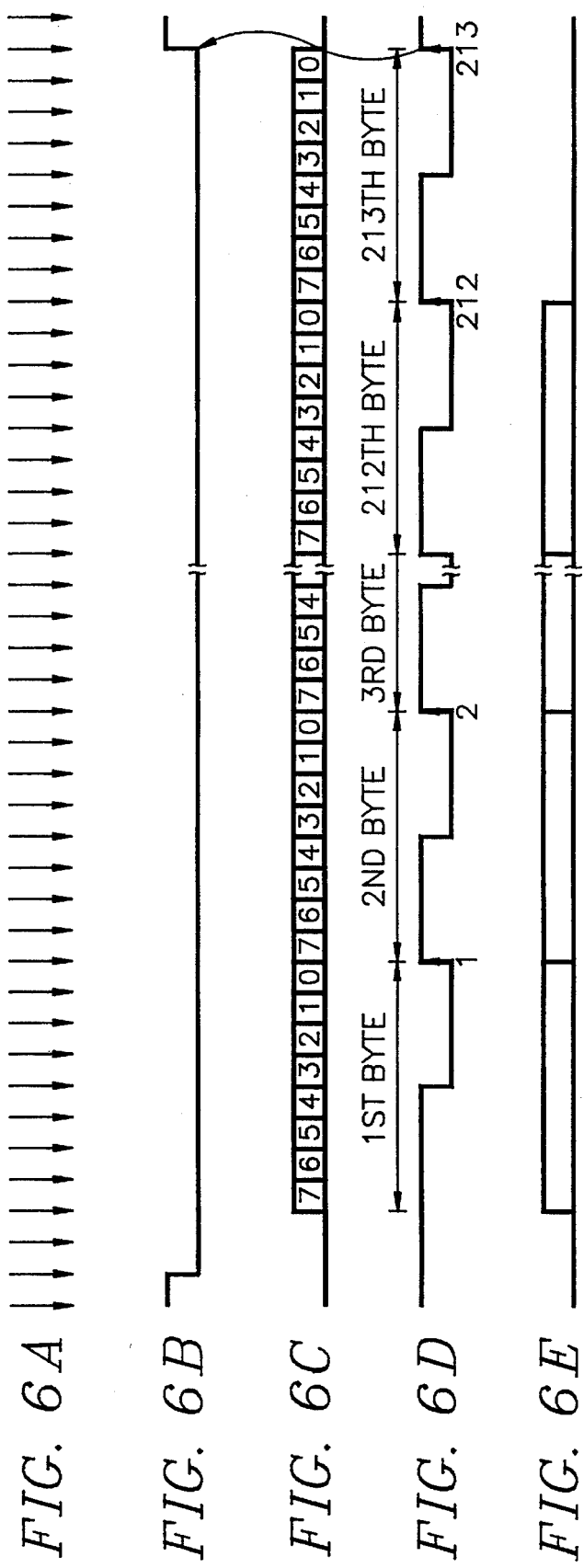

INTERFACE METHOD AND DEVICE IN DIGITAL SIGNAL PROCESSING SYSTEM

BACKGROUND OF THE INVENTION

The present invention relates to an interface method for use in a digital signal processing system and a device for implementing the method. More particularly the invention relates to an interface method and device for transmitting data and control signals according to the rules on the corresponding receiving terminals in the digital signal processing system. A memory is used to store the corresponding data before transmitting predetermined data to the final data receiving terminal.

FIG. 1, which is a block diagram of the conventional digital signal processing system, shows a mini disc regenerating device.

Referring to FIG. 1, a servo controlling part 9 controls the driving of a feed motor 5 and a spindle motor 7. A pick-up part 3 receives an RF (Radio Frequency) signal from a disc 1. RF amplifier 11 amplifies the RF signal input from the pick-up part.

An EFM (Eight to Fourteen Modulation) decoder 15 having construction similar to the signal processing part of a conventional CD (Compact disk) decodes an output signal input from the RF amplifier part 11, and then stores the decoded signal in a memory 17. The memory 17 is controlled by a SRMC 19 (Shock Resistance Memory Controller).

Digital data stored in the memory 17 is outputted in units of sound groups of 212 bytes by a data request signal of an ATRAC (Adaptive Transform Acoustic Coding) decoder 21 under the control of the SRMC 19. Since an error flag indicating whether the digital data contains an error or not is stored in the memory 17, the error flag is outputted with the digital data.

The ATRAC decoder 21 is supplied with data in units of sound groups output from the SRMC 19 and outputs the sound group data to a digital/analog convertor 23 by expanding the sound group data to the original data.

A system controller 27 controls the servo control 9, the EFM decoder 15, the SRMC 19, the ATRAC decoder 21 and a display/key inputting part 25.

FIGS. 2A to 2D show a data organization scheme employed in the digital signal processing system shown in FIG. 1.

The data organization on the mini disc is shown in FIG. 2A. One cluster having 36 sectors is the fundamental unit of a recording operation. One cluster has 32 sectors for audio data and 4 sectors for sub data. During recording, three sectors of the 4 sectors for sub data are assigned to a link sector L and only one sector is assigned to the sub data sector S.

As shown in FIG. 2B, one sector has 2352 bytes. The audio data has 2332 bytes, which is 20 bytes subtracted from 2352 bytes, and can be recorded in one sector. The 20 bytes are the sum of a sync pattern consisting of 12 bytes and a header consisting of 8 bytes. The 2332 bytes consist of 5.5 sound groups. Each of the sound groups has 424 bytes, as shown in FIG. 2C.

Further, one sound group shown in FIG. 2D has 212 bytes in each of the right and left channels. The sound group becomes the fundamental unit of the process of the ATRAC decoder 21. The 424 bytes are obtained from 512 samples (11.61 msec).

FIG. 3 is a block diagram showing a data transmission process of the conventional object interface part shown in FIG. 1. FIGS. 4A to 4E are a timing diagram of an input/output signal of an output interface part 33 (hereafter, called "output I/F part" for short) shown in FIG. 3.

The timing diagram of the output I/F part 33 shown in FIGS. 4A to 4E, indicates a transmission cycle of data consisting of 1 word. The output I/F part performs the transmission cycle 106 times so that the 212 bytes are transmitted.

In FIGS. 3 and 4A to 4E, if a data transmission request signal XRQ shown in FIG. 4B is inputted to the output I/F part 33 from the object interface part (not shown), data corresponding to a read address is outputted to the output I/F part 33 from the memory 17 in response to the data transmission request signal XRQ shown in FIG. 4B. Then, the output I/F part 33 transmits serial data in units of bytes to the object interface part, and then outputs a synchronizing pulse shown in FIG. 4D. A bit clock (about 177 nsec) shown in FIG. 4A is 128 times as large as a sampling frequency FS.

After expanding in the object interface part 21, the transmission data shown in FIG. 4C is applied to the digital/analog convertor 23. The error flag is outputted from the memory 31 and is transmitted for each byte. For example, an error flag which is at the high state indicates that an error was generated in the transmission data.

If the data transmission request signal XRQ is at the high state in the falling edge of the synchronizing pulse of a second byte, the synchronizing pulse of the second byte becomes a rising edge, so that the transmission operation of data corresponding to one word is ended. The output I/F part 33 performs the cycle 106 times, repeatedly.

However, according to the conventional interface method for transmitting audio data to the object interface part, whenever one word is transmitted to the object interface part, the output I/F part 33 should check the data transmission request signal XRQ.

Further, according to the conventional interface method, it is also difficult to classify the channel of the audio data of 212 bytes. That is, it is difficult to classify that the audio data is stored either in the right channel (hereafter, called "R-CH" for short) or in the left channel (hereafter, called "L-CH" for short).

SUMMARY OF THE INVENTION

It is therefore an object of the present invention to provide an interface method of a digital signal processing system for successively transmitting blocks of data of 212 bytes to an object interface part where a data transmission request signal is outputted after once checking whether or not the signal is outputted to the object interface part.

It is another object of the present invention to provide a device which is the most suitable for implementing the interface method in the digital signal processing system.

According to an aspect of the present invention, the interface method of the digital signal processing system for storing digital data regenerated from the recording means in a memory, for reading the digital data from the memory by the data transmission request signal of the object interface part, and for transmitting the digital data to the object interface part, comprises the step of transmitting the digital data read from the memory to the object interface part in units of sound groups after being read in response to one data transmission request signal, and also comprises the step of transmitting channel classification data of 1 byte to classify the channel of the digital data transmitted in the above step, together with the digital data read from the memory, to the object interface part.

Further, according to another aspect of the present invention, the interface device of the digital signal processing system for storing the digital data regenerated from the recording means in the memory, for reading the digital data from the memory by the data transmission request signal of the object interface part, and for transmitting the digital data read from the memory to the object interface part, comprises transmission means for transmitting the digital data to the object interface part by the sound group after being read in response to one data transmission request signal, and also comprises channel classification data generating means for generating channel classification data of 1 byte, together with the data transmitted from the output interface means, to be transmitted to the object interface part.

BRIEF DESCRIPTION OF THE DRAWINGS

The above and other objects, advantages and features of the present invention will be more apparent from the following detailed description taken with the attached drawings in which:

FIGS. 2A to 2D show a data organization plan employed in the digital signal processing system of FIG. 1;

FIG. 3 is a block diagram showing the conventional interface device of FIG. 1;

FIGS. 4A to 4E are timing diagrams showing an input/output signal of an output interface part of FIG. 3;

FIG. 5 is a block diagram showing an interface device according to the present invention; and FIGS. 6A to 6E are timing diagrams showing an input/output signal of the output interface part and L/R classification signal generating part of FIG. 5.

DETAILED DESCRIPTION OF THE PREFERRED EMBODIMENT

Figure 1:
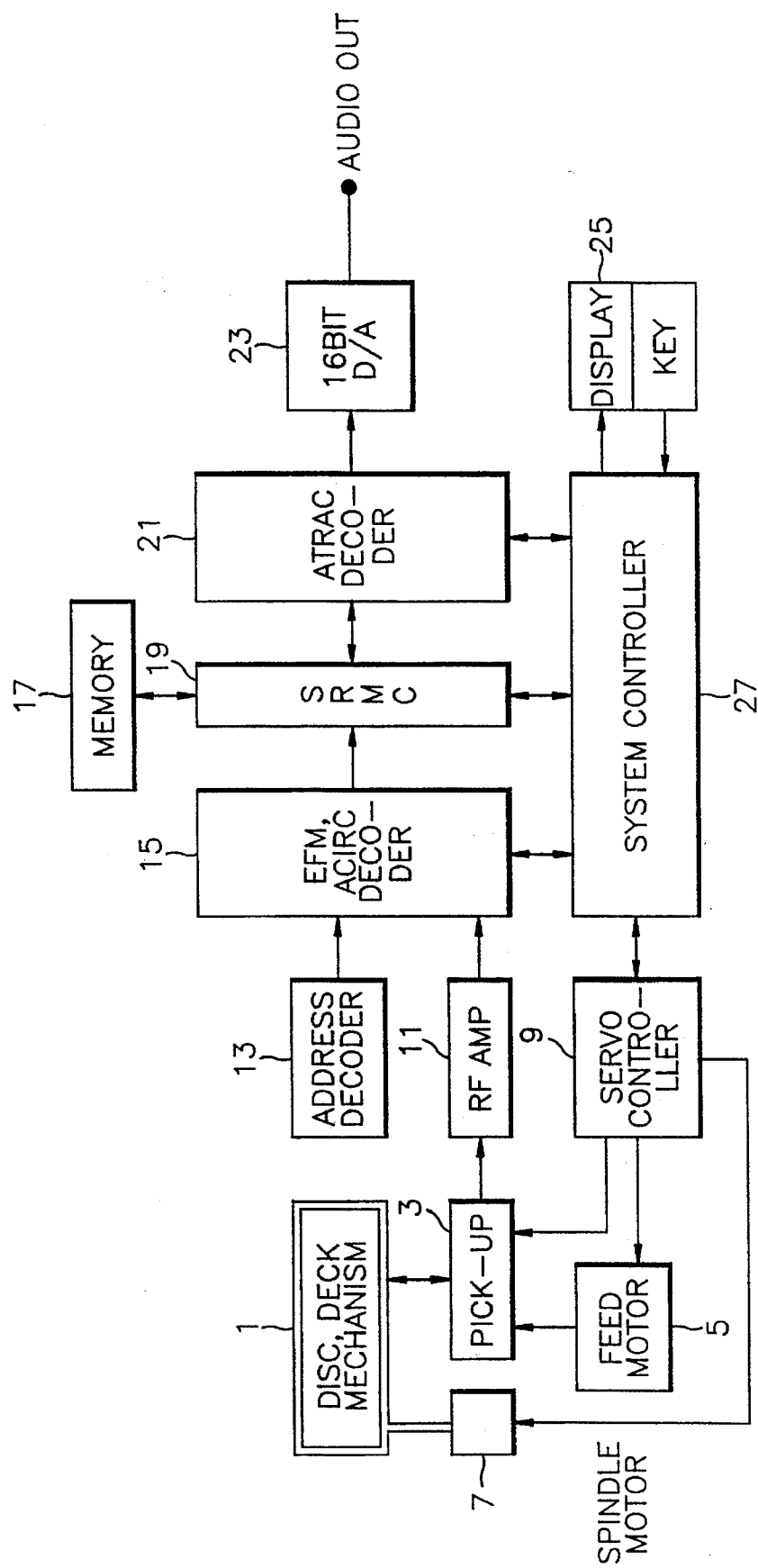
FIG. 1 is a block diagram showing the conventional digital signal processing system.

FIG. 5 is a block diagram showing an interface device according to the preferred embodiment of the present invention.

FIG. 5 consists of a memory 35 for storing the digital data to be transmitted to the object interface part and an output interface and L/R classification signal generating part 37 for successively transmitting the sound group data of 212 bytes of data stored in the memory 35 to the object interface part in response to a data request signal and for generating the channel classification data of 1 byte which transmits data of the 212th byte and data of the 213th byte to the object interface part.

FIGS. 6A to 6E are timing diagrams showing the input/output signal of the output interface and L/R classification signal generating part 37 of FIG. 5.

FIG. 6A shows that the bit clock is 128 times as large as the sampling frequency FS (44.1MHz) and corresponds to the data clock.

FIG. 6B shows that the data transmission request signal XRQ is an active-low and is inputted to the output interface and L/R classification signal generating part 37 from the object interface part (not shown).

FIG. 6C shows that the transmission data is outputted to the object interface part and is synchronized to the bit clock shown in FIG. 6A.

FIG. 6D shows the synchronizing pulse signal corresponding to one byte of the output data of the output interface and L/R classification generating part 37, whose pulse width is four times as large as the bit clock.

FIG. 6E shows that the error flag indicates whether or not the transmission data shown in FIG. 6C is error and also is represented as "low state" or "high state" in the byte interval of the corresponding data. For example, when the transmission data becomes "high state", it is regarded as error.

The operations according to the present invention will be explained in detail with reference to FIGS. 5 and 6.

Referring to FIGS. 5 and 6, the memory 35 is the same memory 31 of FIG. 1. The output interface and L/R classification signal generating part 37 corresponds to one of the internal function blocks which is included in the SRMC 19shown in FIG. 1.

The interface between the object interface part and the output interface and L/R classification signal generating part 37 operates as follows.

As shown in FIGS. 6A to 6E, the data transmission request signal XRQ is inputted to the object interface part. The signal XRQ is the only one of the five interface signals which can be inputted to the object interface part. Therefore, it is possible to begin performing the data transmission operation when the data transmission request signal XRQ is activated. If the data transmission request signal XRQ is inputted to the output interface and L/R classification signal generating part 37, a read address is generated to read data stored in the memory 35 and also is applied to the memory 35 by the output interface and L/R classification signal generating part 37. Then, the data corresponding to the read address is read from the memory 35.

Generally, the output interface and L/R classification signal generating part 37 parallel inputs the data read from the memory 35 by 4 bits or by 8 bits, and then transmits the data to the object interface part after converting the data into serial data.

That is, if the data transmission request signal XRQ is inputted to the output interface and L/R classification signal generating part 37, the sound group data of 212 bytes, being the process unit of the object interface part (here, corresponding to the ATRAC decoder 21), is read from the memory 35. After transmitting the data read from the memory 35 to the object interface part, the output interface and L/R classification signal generating part 37 holds the read operation. And then, when the data transmission request signal XRQ is again activated, the output interface and L/R classification signal generating part 37 begins to again perform the read operation of the memory 35 in the next read address held.

Meanwhile, L/R channel classification data is generated from the output interface and L/R classification signal generating part 37. As shown in FIG. 2, the L/R classification data is also generated by combining a third sector number of header data of 4 bytes which is positioned at the forefront of the sector, and the data transmission request signal XRQ. For example, when the generated data is at 'FF', the data corresponds to the L-CH data of the L/R classification channel data, and when the generated data is at '00', the data corresponds to the R-CH data thereof. According to the rule that the first sound group of the corresponding sector numbers corresponds to the L-CH data when the corresponding sector becomes an even number, it is possible to generate the L/R channel classification data with the sector number.

As mentioned above, if data is transmitted to the object interface part, the input of the 213th byte is completed by counting the number of bytes of the transmitted data. Further, when the data transmission request signal XRQ is at the high state, the interface and L/R classification signal generating part 37 holds the read operation of the memory 35. The object interface part checks the data pattern of the 213th byte, so that it is possible to discern where the 212th byte is currently inputted. Further, it is possible to discern whether or not the transmission data is inputted by counting the synchronizing pulse shown in FIG. 6D.

On the other hand, the error flag indicating whether or not data is error is stored in the memory 35 by the byte. Therefore, if the data transmission request signal XRQ is inputted to the memory 35, the error flag is read from the memory 35 and is transmitted together with data.

The digital signal processing device applicable 30 or available to the interface method of the present invention comprises systems using disks such as mini discs, CD-ROMs, and CD-I (Compact Disk Interactive) as the recording means, and a DAT (Digital Audio Tape Recorder) system using tape as the recording means.

As mentioned above, in the digital signal processing system according to the present invention, after once checking whether or not the data transmission request signal is outputted to the object interface part, if the output operation is performed, the data of 212 bytes can be successively transmitted to the object interface part during the activation of the data transmission request signal, so as to increase the efficiency of the system and to make the hardware simple. The interface part is implemented by hardware.

Efficiency is further enhanced by reducing the load of the controlling part of the system, i.e., the load of the microcomputer, by transmitting the data of 212 bytes and the data of 1 byte for the check of the L/R channel so as to classify the channel of the transmission data.

What is claimed is:

1. An interface method for a digital signal processing system comprising the steps of:

storing digital data regenerated from a recording means in a memory;

reading said digital data from said memory in response to a data transmission request signal of an object interface part;

transmitting said digital data to said object interface part in units of sound groups, one of said sound groups being transmitted during two cycles of said data transmission request signal; and transmitting channel classification data of 1 byte to classify a channel associated with said data transmitted in the transmitting step, together with said digital data, to said object interface part.

2. An interface method as claimed in claim 1, wherein a bit clock, a synchronizing pulse, an error flag indicating whether said digital data contains an error and said digital data are transmitted to said object interface part according to an interface timing.

3. An interface device of a digital signal processing system comprising:

storing means for storing digital data regenerated from a recording means;

reading means for reading said digital data in response to a data transmission request signal;

transmission means for transmitting the read digital data to an object interface part in units of sound groups, one of said sound groups being transmitted during two cycles of said data transmission request signal; and channel classification data generating means for generating channel classification data of 1 byte, together with said digital data transmitted from an output interface means, to be transmitted to said object interface part.

4. An interface device as claimed in claim 3, wherein said output interface means transmits a bit clock, a synchronizing pulse, an error flag indicating whether said digital data contains an error and said digital data, to said object interface part according to an interface timing.

5. An interface device of a digital signal processing system comprising:

storing means for storing digital data regenerated from a recording means;

reading means for reading said digital data in response to a data transmission request signal;

transmission means for transmitting the read digital data to an object interface part in units of sound groups; and channel classification data generating means for generating channel classification data of 1 byte, together with said digital data transmitted from an output interface means, to be transmitted to said object interface part, wherein said channel classification data is generated by combining a predetermined sector number of the recording means and said data transmission request signal.

* * * * *